United States Patent
Lamberton et al.

(10) Patent No.: US 6,789,121 B2
(45) Date of Patent: Sep. 7, 2004

(54) METHOD OF PROVIDING A VIRTUAL PRIVATE NETWORK SERVICE THROUGH A SHARED NETWORK, AND PROVIDER EDGE DEVICE FOR SUCH NETWORK

(75) Inventors: Marc Lamberton, Antibes (FR); Eric Mouque, Antibes (FR); François Kermarec, Cagnes sur Mer (FR)

(73) Assignee: Nortel Networks Limited, St. Laurent (CA)

( * ) Notice: Subject to any disclaimer, the term of this patent is extended or adjusted under 35 U.S.C. 154(b) by 294 days.

(21) Appl. No.: 10/185,113

(22) Filed: Jun. 28, 2002

(65) Prior Publication Data

US 2003/0154259 A1 Aug. 14, 2003

(30) Foreign Application Priority Data

Feb. 8, 2002 (EP) .............................. 02290317

(51) Int. Cl.[7] .......................... G06F 15/16; G06F 13/42
(52) U.S. Cl. ....................... 709/227; 709/228; 709/237; 709/225; 709/205; 370/420
(58) Field of Search ................................ 370/401, 420, 370/441, 241, 395.54; 709/200, 201, 213, 204, 205, 223, 225, 227, 228, 232, 237

(56) References Cited

U.S. PATENT DOCUMENTS

| | | | |
|---|---|---|---|
| 6,654,347 B1 | * 11/2003 | Wiedeman et al. | 370/241 |
| 2001/0034758 A1 | * 10/2001 | Kikinis | 709/203 |
| 2003/0108051 A1 | * 6/2003 | Bryden et al. | 370/395.54 |
| 2003/0110268 A1 | * 6/2003 | Kermarec et al. | 709/227 |

FOREIGN PATENT DOCUMENTS

| | | |
|---|---|---|
| EP | 1318631 A2 | * 6/2003 |
| EP | 1372298 A1 | * 12/2003 |

OTHER PUBLICATIONS

Request For Comments (RFC) 2764—Feb.2000—IETF—A Framework for IP Based Virtual Private Networks.
Request For Comments (RFC) 3031—Jan.2001—IETF—Multiprotocol Label Switching Architecture.
Internet Draft draft–vkompella–ppvpn–vpsn–mpls–00.txt,—Jul.2001—IETF—Virtual Private Switched Network Services over an MPLS Network.
Internet Draft draft–martini–l2circuit–trans–mpls–08.txt—Nov.2001—IETF—Transport of Layer 2 Frames Over MPLS.
Request For Comments (RFC) 3036—Jan.2001—IETF—LDP Specification.

* cited by examiner

*Primary Examiner*—B. James Peikari
(74) *Attorney, Agent, or Firm*—Barnes & Thornburg

(57) ABSTRACT

A virtual private network (VPN) service is provided through a shared network infrastructure comprising a plurality of interconnected provider edge (PE) devices having customer edge (CE) interfaces. Some of the CE interfaces are allocated to a VPN supporting a plurality of virtual local area networks (VLANs) and are arranged for exchanging traffic data units with CE devices. Each traffic data unit includes a VLAN identifier. At least one virtual connection is established in the shared network infrastructure between two CE interfaces of different PE devices, allocated to said VPN, for forwarding traffic data units including a VLAN identifier. Said virtual connection (VC) has an identifier determined from said VLAN identifier and an identifier of said VPN.

16 Claims, 3 Drawing Sheets

METHOD OF PROVIDING A VIRTUAL PRIVATE NETWORK SERVICE THROUGH A SHARED NETWORK, AND PROVIDER EDGE DEVICE FOR SUCH NETWORK

BACKGROUND OF THE INVENTION

The present invention relates to the provision of virtual private network (VPN) services through carrier networks such as Metropolitan Area Networks (MANs) or Wide Area Networks (WANs).

A VPN emulates a private network over public or shared infrastructures. When the shared infrastructure is an IP network such as the Internet, the VPN can be based on an IP tunneling mechanism, as described in Request For Comments (RFC) 2764 published in February 2000 by the Internet Engineering Task Force (IETF). Another approach, more particularly concerned by the present invention, provides link layer connectivity for the devices affiliated to the VPN.

Traditional WAN data layer 2 services provided by carriers are based on the virtual circuit or virtual connection concept. Data units are switched within the carrier network along pre-established trails referred to as virtual connections. These data units are for instance packets in X.25 networks, frames in Frame Relay (FR) networks, cells in Asynchronous Transfer Mode (ATM) networks, . . . The carrier network may also have a Multi-Protocol Label Switching (MPLS) architecture built over an infrastructure supporting a connectionless network layer protocol such as IP. MPLS is described in RFC 3031 published in January 2001 by the IETF. The virtual connections within a MPLS network are referred to as Label Switched Paths (LSPs).

The virtual connections can be pre-established by a configuration process, called "provisioning", performed by the network operator: they are then called Permanent Virtual Circuits (PVC). Alternatively, they can be established dynamically on request from the customer equipment: they are then called Switched Virtual Circuits (SVC).

Providing a SVC service puts constraints on both the Provider Edge (PE) and the Customer Edge (CE) devices. Both must support a common signaling set-up protocol such as, e.g., the ATM Q.2931 signaling protocol for ATM switched networks. Signaling protocols are complex, they induce additional costs (equipment costs, operational costs . . . ) and they may cause interoperability problems. Inadequate operation of one CE may block a PE and hence interrupt the service for several other customers. Most of the time, higher-level protocols and applications have not been designed to properly drive such SVC signaling, and it is necessary to develop sub-optimal emulation modes (for instance LAN emulation, classical IP, ... ). These issues can explain why SVC services have been so seldom deployed for FR and ATM networks.

On the other hand, providing a PVC service requires an agreement between the provider and the customer regarding the endpoints of each virtual connection. Then it requires provisioning of each virtual connection by the provider. Often, it also requires additional provisioning by the customer in the CE device, unless some special signaling allows CE devices to automatically discover the virtual connections. In any case, these provisioning actions must be performed coherently between the provider and his customers, and they are a potential source of problems.

Recently, several vendors have been promoting Ethernet as a universal access media for LAN, MAN and WAN services. Several drafts presented at the IETF cover the way to signal and provision layer 2 virtual private network (L2 VPN) services based on an IP/MPLS infrastructure (see, e.g., Kompella et al., "MPLS-based Layer 2 VPNs", Internet Draft, draft-kompella-ppvpn-12vpn-00.txt, published in June 2001 by the IETF).

As specified in the IEEE standard 802.1Q approved in December 1998, Ethernet networks may support one or more Virtual Local Area Networks (VLANs). An Ethernet frame circulating in such a network may include, after the Medium Access Control (MAC) address, an additional field called tag header or Q-tag which contains a VLAN identifier (VID). Accordingly, a VLAN-aware Ethernet bridge has the ability to perform frame switching based on the VID, deduced either from the physical port from which the incoming frame is received or from the contents of its tag header. A VLAN is used for the layer 2 broadcasting and forwarding of frames within a sub-group of users (subscribers of that VLAN). For example, in a corporation, it is possible to define respective virtual LANs for various departments to enable selective broadcasting and forwarding of information in the layer 2 procedures.

It has been suggested that the concept of VLAN can be extended in the case where Ethernet traffic is transported over a MPLS network (see, e.g., Martini et al., "Transport of Layer 2 Frames Over MPLS", Internet Draft, draft-martini-12circuit-trans-mpls-08.txt, published in July 2001 by the IETF).

In such a case, a specific MPLS virtual connection, or LSP, originating at a PE can be associated with each VLAN to forward the frames intended for subscribers of that VLAN. The CE sends tagged frames to the PE and the latter switches them to the relevant virtual connections based on the ingress physical port and the VID.

Because Ethernet media were designed from the beginning as a LAN technology, they do not provide the signaling mechanisms required for WAN SVC networks. So establishing Ethernet PVC across a WAN network requires provisioning in both PE and CE devices.

Many parameters must be provisioned and stored especially in the PE device to allow a L2 VPN service.

An object of the present invention is to alleviate these provisioning issues.

Another object is to provide simplified signaling and set-up procedures for virtual connections between VLANs.

SUMMARY OF THE INVENTION

The invention proposes a method of providing a VPN service through a shared network infrastructure comprising a plurality of interconnected PE devices having CE interfaces. Some of the CE interfaces are allocated to a VPN supporting a plurality of VLANs and are arranged for exchanging traffic data units with respective CE devices, each traffic data unit including a VLAN identifier. The method comprises the step of:

establishing at least one virtual connection (VC) in the shared network infrastructure between two CE interfaces allocated to said VPN, for forwarding traffic data units including a respective VLAN identifier.

According to the invention, said VC has an identifier determined from said VLAN identifier and an identifier of said VPN.

In this way, it is not necessary to provide each PE device manually with VC identifiers for each CE interface. By the invention, a VC identifier is indeed directly derived from a known VPN identifier and a VLAN identifier known or discovered by a PE device. It thus simplifies the configuration of the PE devices by limiting the number of parameters values to be entered in their configuration table.

Such method does not cause identification ambiguity because the VPN service must precisely virtually connect two or more CE devices of a same VLAN within a VPN. So, the use, on the shared network infrastructure, of a virtual connection identifier that is based on VPN and VLAN identifiers is well adapted.

It even avoids interconnections of CE devices that would belong to different VLANs, whereas this can occur when provisioning the VC identifiers independently of the VLANs.

Advantageously, the VC identifier can be a code that directly contains concatenated VPN and VLAN identifiers.

In a preferred embodiment of the invention, the VCs are labeled switched paths (LSPs) of a MPLS architecture supported by the shared network infrastructure. However, other types of carrier networks can be used to provide a L2 VPN service in accordance with the invention, on the condition they comprise an addressing field for containing a VC identifier.

In case of a MPLS architecture, the PE devices are LERs (Label Edge Routers) and a virtual connection between two CE interfaces of two respective PE devices can be set-up with an appropriate protocol, like LDP (Label Distribution Protocol).

Another aspect of the invention relates to a method of establishing a VC between PE devices, for transporting traffic data units pertaining to a VLAN supported by a VPN, wherein said VPN comprises CE devices each connected to a respective PE device, wherein the VC has an identifier determined from an identifier of said VLAN and an identifier of said VPN.

Another aspect of the invention relates to a PE device comprising:

means for interconnecting to a shared network infrastructure;

at least one CE interface allocated to a VPN supporting a plurality of VLANs, arranged for exchanging traffic data units with a respective CE device, each traffic data unit including a VLAN identifier; and means for establishing at least one VC between a first CE interface of said PE device and a second CE interface of another PE device interconnected to the shared network infrastructure, for forwarding traffic data units including a respective VLAN identifier, wherein the VC has an identifier determined from said VLAN identifier and an identifier of said VPN.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

The invention is illustrated here in its currently preferred application to a VPN service of the Ethernet type using a MPLS-based carrier infrastructure. It will be appreciated that it can also be applied to other types of customer and/or provider networks.

The carrier network 10 shown in FIGS. 1–6 is for instance an IP network having routers supporting the MPLS architecture. Some of these routers 11 are label edge routers (LERS) adapted to form PE devices for the provision of the L2 VPN service. They are denoted PE-1 to PE-3 in the diagram of FIGS. 1–6. Other routers (not shown) of the carrier network 10 are label-switched routers (LSRs) which link the LERs by a full mesh of logical links (transport tunnels).

Each PE device 11 is initially configured by the provider with the list of the IP addresses of all the remote PE devices.

FIGS. 1–6 also show customer edge devices 12 that are each connected to a respective CE port of a PE device 11. These CE devices 12 are denoted CE-A to CE-E, with CE-A and CE-B connected to PE-1, CE-C connected to PE-2, and CE-D and CE-E connected to PE-3. We assume here that the CE devices are supporting VLANs and are using tagged traffic compliant with the IEEE 802.1Q standard. Untagged traffic is assigned to the default VLAN identifier (VID)=0.

In each PE device, the service provider configures the VPN-id of each CE interface, or port, offering a L2 VPN service. Each local port number is thus allocated to one VPN-id.

Figure 1:
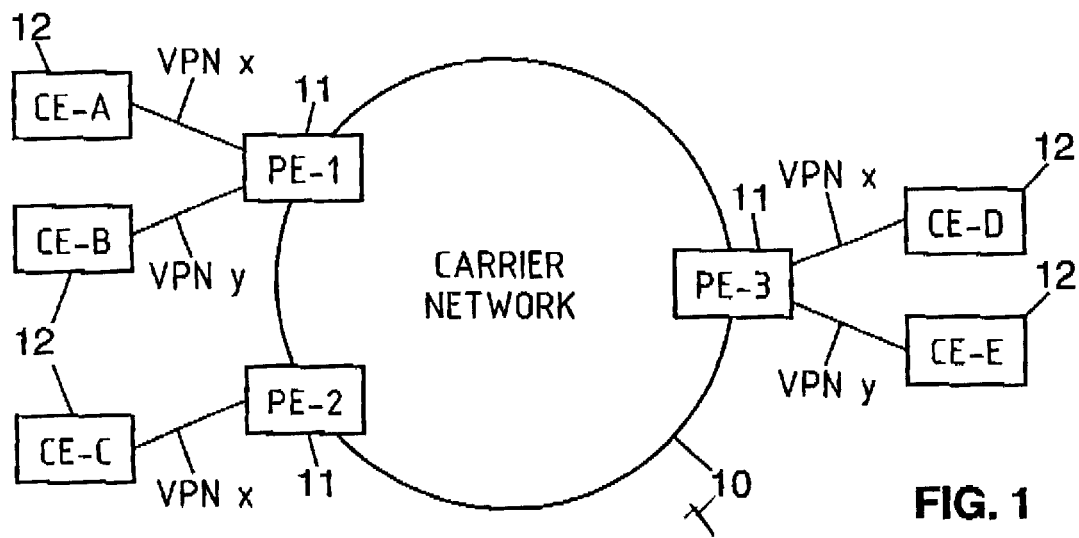
FIGS. 1, 2 and 3 are diagrams of a simplified example of virtual private network delivering a point to point service.

FIG. 1 shows an example with two customer VPNs, having VPN-id=x and VPN-id=y. VPN x includes CE devices CE-A, CE-C and CE-D. VPN y includes CE devices CE-B and CE-E.

The distribution of the VLANs can be configured by the carrier network operator in the PE devices. Alternatively, it can be learnt automatically at the PE devices based on the VIDs included in the tagged frames received from the CE devices, as disclosed in our co-pending patent application, filed on Jan. 22, 2002 under priority of the European application EP 01403179.3, entitled "Methods of establishing virtual circuits and of providing a virtual private network service through a shared network, and provider edge device for such network", the contents of which is incorporated herein by reference. In both cases, the VIDs have finally to be stored in a configuration table of the corresponding PE devices.

Figure 2:
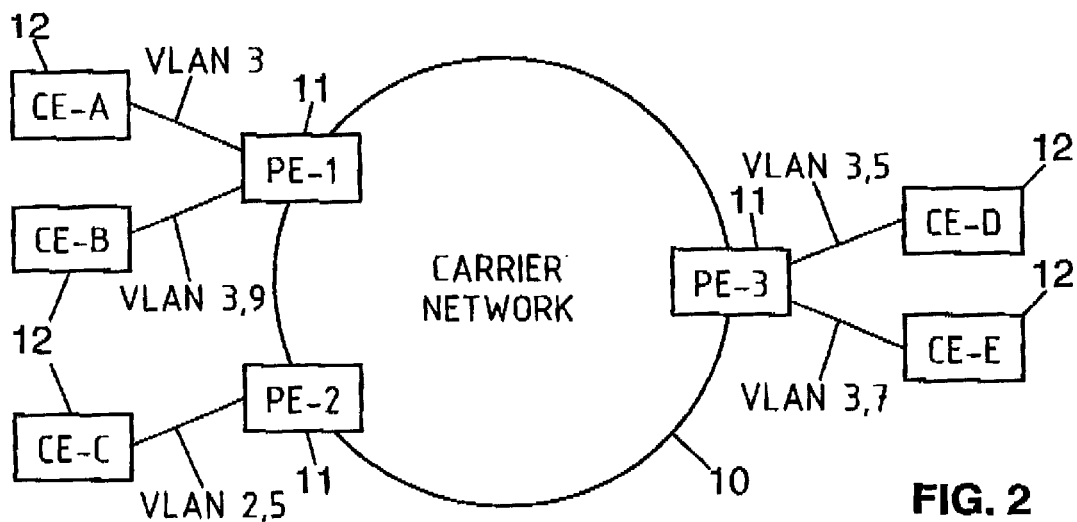

FIG. 2 shows an exemplary distribution of VLAN identifiers in the relation to configuration of FIG. 1. On the figure, at most two CEs per VPN use a same VLAN identifier, which is consistent with a point-to-point service (in this example, there is one CE device for (VPN-id, VID)=(x, 2), (y, 7) or (y, 9), and two CE devices for (VPN-id, VID)=(x, 3), (x, 5) or (y, 3)).

A PE device, say PE-1, must be able to forward incoming traffic from a CE device connected to one of its CE interfaces, say CE-A, over the carrier network 10, to a second CE interface of another PE device, say PE-3, having the same VID and the same VPN-id as said first CE interface of PE-1. The second CE interface leads to CE-D on the example drawn on FIGS. 1–2, since both considered CE interfaces have a common pair (VPN-id, VID)=(x,3).

For this purpose, a virtual connection must be established between CE-A and CE-D, through PE-1 and PE-3 and over the carrier network 10. This can be done through any signaling protocol suitable to set up LSPs, such as LDP (Label Distribution Protocol, see RFC 3036 published in January 2001 by the IETF), RSVP (Resource reSerVation Protocol, see RFC 2205 published in September 1997 by the IETF), etc. LDP is a preferred protocol, and will be more particularly considered in the following.

RFC 3036 describes the LSPs set up procedure. For instance, it can be performed by a PE device with an extended discovery mechanism as described in section 2.4.2. This mechanism consists for a device in sending UDP (User Datagram Protocol) packets periodically to a specific address, which is typically the address of another device. The latter can choose to respond in the same way. An LDP session is then established between the devices. The above-mentioned Internet Draft draft-martini-12circuit-trans-mpls-08.txt, which is incorporated herein by reference, defines a specific element to perform the connection of the PE devices in the context of the transport of L2 VPN frames over MPLS. This element is included in exchanged packets between both PE devices. It is a 128 bits element, wherein a 32 bits field represents the virtual connection (VC) identifier. A PE device receiving a VC identifier value from another PE device, compares it with its own VC identifiers, that is to say the VC identifiers it has been provided with. When VC identifiers match between both PE devices, a virtual connection is established between them. At the same time, VC-labels can be allocated for the two ways as described in the RFC 3036 and they are stored by each PE device, in relation to a CE interface and a VLAN allocated to this CE interface.

Later, the virtual connection will be used to transport Ethernet frames between CE devices connected to the corresponding PE devices. And the respectively originating and terminating PE devices will respectively push and pop the VC-labels they have stored during the LDP session.

It can be noted that a virtual connection can be established even between two CE interfaces belonging to a unique PE device.

In a prior art method, the VC identifiers are provided to each PE device, for example during a manual configuration stage, in such a way that two PE devices, that have at least a CE interface allocated to a same VPN and likely to carry traffic of a same VLAN, must share a common VC identifier. For instance, referring back to FIGS. 1–2, CE-A and CE-D have a common pair (VPN-id, VID), so PE-1 and PE-3, they are connected to through CE interfaces, must be provided with a common VC identifier for the virtual connection between CE-A and CE-D.

Figure 3:
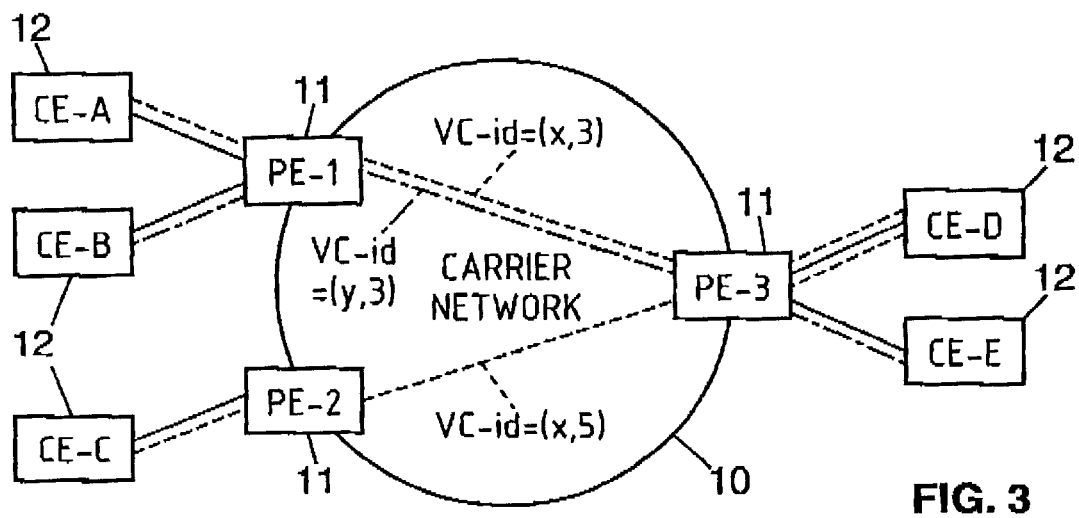

FIG. 3 shows the VCs established for the network of FIGS. 1–2, that require a specific VC identifier (VC-id) in the corresponding PE devices: a VC in dashed lines between PE-1 and PE-3 for communication of tagged frames of VPN x with VID=3 between CE-A and CE-D; a VC in dashed lines between PE-2 and PE-3 for communication of tagged frames of VPN x with VID=5 between CE-C and CE-D; and a VC in dashed-and-dot lines between PE-1 and PE-3 for communication of tagged frames of VPN y with VID=3 between CE-A and CE-E.

A PE device must thus be aware of many parameters during or after a configuration stage, that can be long and likely to contain errors, especially if it consists in filling a configuration table manually. Indeed, in this case, a provider must configure for each PE device and for each of its CE interfaces, the following entries:

- a port number,
- a VPN-id,
- a list of VIDs (if not learnt by the PE device by tagged frames exchange),
- a VC-id per VLAN,
- an incoming VC-label per VLAN,
- an outgoing VC-label per VLAN.

It must also maintain the tables after an event that could change some value.

The invention maps the VC-id parameter with other configured parameters in order to reduce and simplify the provisioning. As a virtual connection is aimed at transporting frames inside a VLAN of a VPN over the carrier network, the associated parameter VC-id can be determined from the corresponding pair (VPN-id, VID). The VC-id can be defined for example as a concatenation of the corresponding (VPN-id, VID).

FIG. 3 shows the VC-ids provided in the network of FIGS. 1–2. The VC used for transporting frames of VLAN #3 over the carrier network between CE-A and CE-D has VC-id=(x, 3). The one used for transporting frames of VLAN #3 between CE-B and CE-E has VC-id=(y, 3). The one used for transporting frames of VLAN #5 between CE-C and CE-D has VC-id=(x, 5).

During a configuration stage, the provider does not fill in the VC-id fields in a PE device configuration table. It does not need to ensure a mapping between two customers, with the same (VPN-id, VID), connected to two different PE devices. The VC-id is indeed automatically obtained by concatenating the fields (VPN-id, VID), previously provided.

If provisioning is performed by learning, each time a VID is discovered, a corresponding VC-id is determined from said VID and the adequate VPN-id (already known by the PE-device).

There is no ambiguity by determining a VC-id from a pair (VPN-id, VID), because a PE device precisely switches tagged frames from a CE interface according to the VID included in the tag, within the corresponding VPN.

It is also a guarantee that two CE devices of the same VLAN but from different VPNs will not be interconnected, because the corresponding PE devices, they are connected to, will always have different VC-ids and then no virtual connection will be set up between them.

A reuse of VIDs in different VPNs is possible, since only the pair (VPN-id, VID) identifies a VC-id.

Figure 4:
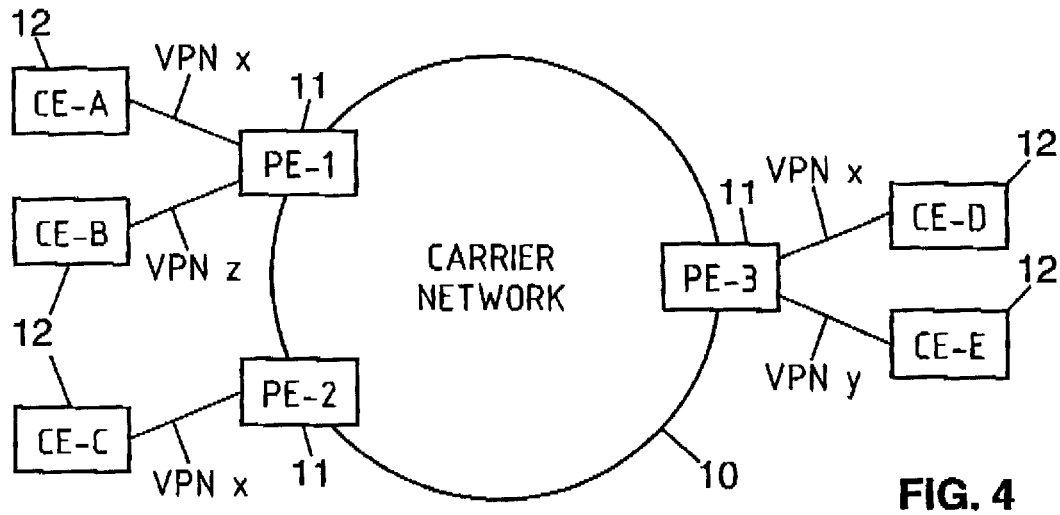
FIGS. 4, 5 and 6 are diagrams of a simplified example of virtual private network delivering a 'any to any' service.
Figure 5:
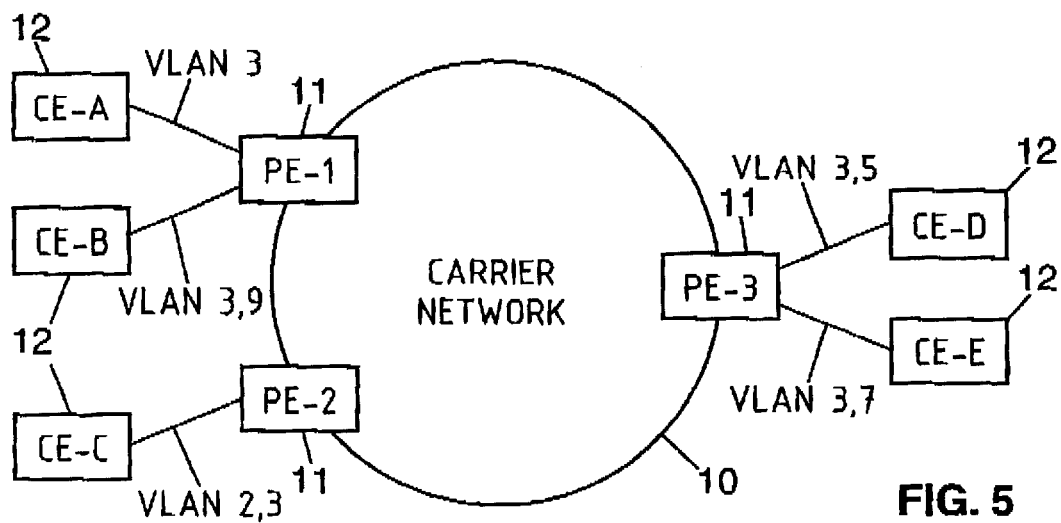
Figure 6:
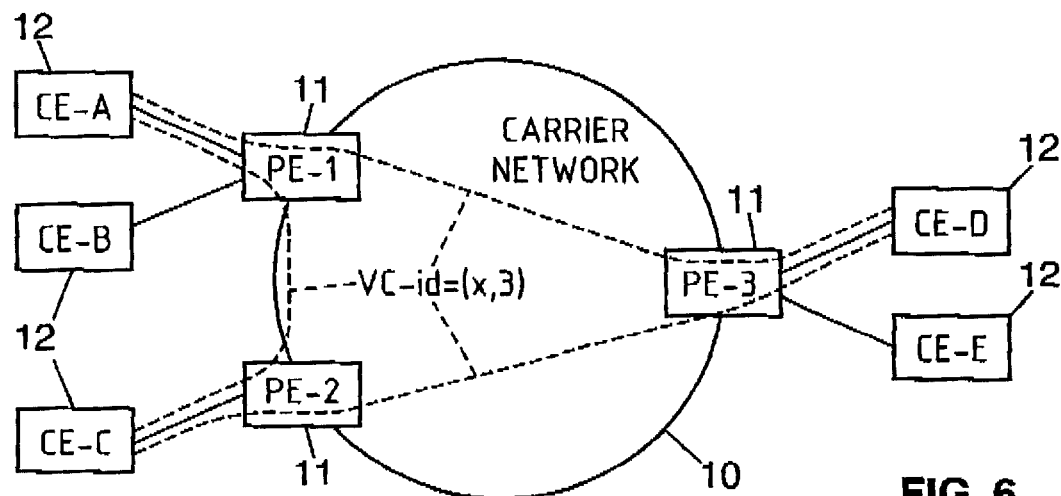

FIGS. 4–6 show another example for a network delivering a 'any to any' service. Here, more than two CE devices of a common VPN are allowed to transfer traffic pertaining to the same VLAN. In the example, the CE interfaces between CE-A and PE-1, CE-D and PE-3, and CE-C and PE-2 are allocated to VPN x and use VID=3. According to the invention, the same VC-id=(x, 3) is used for the three VCs established between said CE interfaces two by two respectively, as shown in dashed lines on FIG. 6. If a frame tagged with VID=3 is sent by CE-A for instance, it is forwarded by PE-1 to both CE-C and CE-D, over the corresponding VCs, according to the VC-id=(x, 3).

Figure 7:
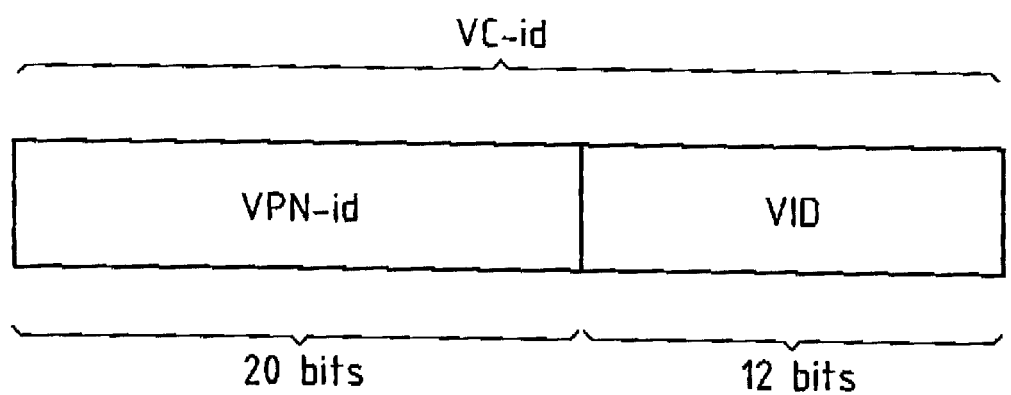
FIG. 7 is an example of format for the VC identifier.

A format of VC-id is shown on FIG. 7 by way of example. The VC-id is coded on 32 bits, among which the 20 most significant bits represent the VPN-id and the 12 least significant bits the VID. This format gives the opportunity to provide service for 1,048,576 VPNs. A VPN can provide 4,096 VLANs which is quite comfortable, even for large service providers.

The text of the abstract repeated below is hereby deemed incorporated in the description:

A virtual private network (VPN) service is provided through a shared network infrastructure comprising a plurality of interconnected provider edge (PE) devices having customer edge (CE) interfaces. Some of the CE interfaces are allocated to a VPN supporting a plurality of virtual local area networks (VLANs) and are arranged for exchanging traffic data units with CE devices. Each traffic data unit includes a VLAN identifier. At least one virtual connection is established in the shared network infrastructure between two CE interfaces of different PE devices, allocated to said VPN, for forwarding traffic data units including a VLAN identifier. Said virtual connection (VC) has an identifier determined from said VLAN identifier and an identifier of said VPN.

We claim:

1. A method of providing a virtual private network (VPN) service through a shared network infrastructure comprising a plurality of interconnected provider edge (PE) devices having customer edge (CE) interfaces, wherein some of the CE interfaces are allocated to a VPN supporting a plurality of virtual local area networks (VLANs) and are arranged for exchanging traffic data units with respective CE devices, each traffic data unit including a VLAN identifier, the method comprising the step of:

establishing at least one virtual connection in the shared network infrastructure between two CE interfaces allocated to said VPN, for forwarding traffic data units including a respective VLAN identifier, wherein said virtual connection (VC) has an identifier determined from said VLAN identifier and an identifier of said VPN.

2. A method as claimed in claim 1, wherein said VC identifier is a concatenation of said VPN identifier and said VLAN identifier.

3. A method as claimed in claim 2, wherein said VC identifier is a 32-bit code having 20 most significant bits corresponding to said VPN identifier and 12 least significant bits corresponding to said VLAN identifier.

4. A method as claimed in claim 1, wherein said VLAN identifier and said VPN identifier are stored in the respective PE devices having said two CE interfaces.

5. A method as claimed in claim 4, wherein the at least one virtual connection is established only if said VLAN identifier or said VC identifier is stored in both PE devices having said two CE interfaces.

6. A method as claimed in claim 1, wherein the PE devices and the shared network infrastructure are based on a MPLS (Multi-Protocol Label Switching) architecture and wherein the at least one virtual connection is established through a LDP (Label Distribution Protocol) session.

7. A method as claimed in claim 1, wherein the PE devices cooperate based on a MPLS (Multi-Protocol Label Switching) architecture and wherein the virtual connection is established through a LDP (Label Distribution Protocol) session.

8. A method of establishing a virtual connection between provider edge (PE) devices, for transporting traffic data units pertaining to a virtual local area network (VLAN) supported by a virtual private network (VPN), wherein said VPN comprises customer edge (CE) devices each connected to a respective PE device, wherein said virtual connection (VC) has an identifier determined from an identifier of said VLAN and an identifier of said VPN.

9. A method as claimed in claim 8, wherein said VC identifier is a concatenation of said VPN identifier and said VLAN identifier.

10. A method as claimed in claim 9, wherein said VC identifier is a 32-bit code having 20 most significant bits corresponding to said VPN identifier and 12 least significant bits corresponding to said VLAN identifier.

11. A provider edge (PE) device comprising:

means for interconnecting to a shared network infrastructure;

at least one customer edge (CE) interface allocated to a virtual private network (VPN) supporting a plurality of virtual local area networks (VLANs), arranged for exchanging traffic data units with a respective CE device, each traffic data unit including a VLAN identifier; and means for establishing at least one virtual connection between a first CE interface of said PE device and a second CE interface of another PE device interconnected to the shared network infrastructure, for forwarding traffic data units including a respective VLAN identifier, wherein said virtual connection (VC) has an identifier determined from said VLAN identifier and an identifier of said VPN.

12. A device as claimed in claim 11, wherein said VC identifier is a concatenation of said VPN identifier and said VLAN identifier.

13. A device as claimed in claim 12, wherein said VC identifier is a 32-bit code having 20 most significant bits corresponding to said VPN identifier and 12 least significant bits corresponding to said VLAN identifier.

14. A device as claimed in claim 11, further comprising means for storing said VLAN identifier and said VPN identifier in a configuration table.

15. A device as claimed in claim 11, further comprising means for receiving traffic data units including a VLAN identifier from another PE device interconnected to the shared network infrastructure and means for establishing a virtual connection only if said VLAN identifier or an identifier of said virtual connection are stored in said configuration table.

16. A device as claimed in claim 11, wherein the means for interconnecting to the shared network infrastructure are in accordance with a MPLS (Multi-Protocol Label Switching) architecture and arranged for establishing said at least one virtual connection through a LDP (Label Distribution Protocol) session.

* * * * *